Dec. 11, 1934.    R. L. EVENBURGH    1,983,844
SHEAVE
Filed Dec. 7, 1929    2 Sheets-Sheet 1
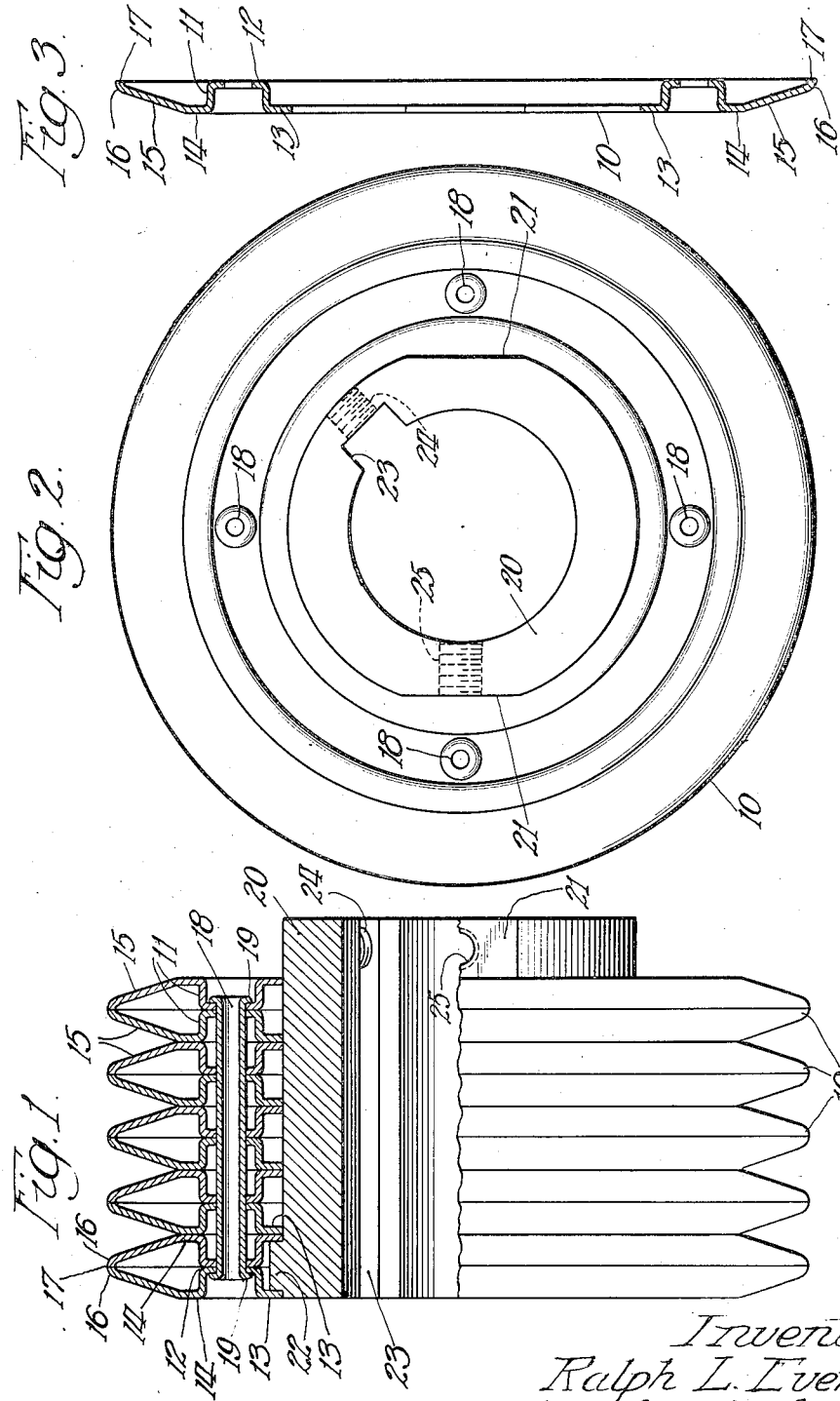
Inventor
Ralph L. Evenburgh
Wilson, Dowell, McCanna & Rehm
Attys.

Dec. 11, 1934.  R. L. EVENBURGH  1,983,844
SHEAVE
Filed Dec. 7, 1929   2 Sheets-Sheet 2
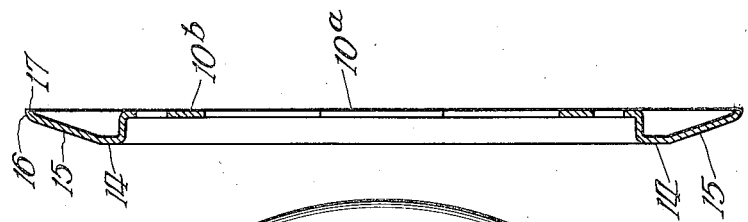
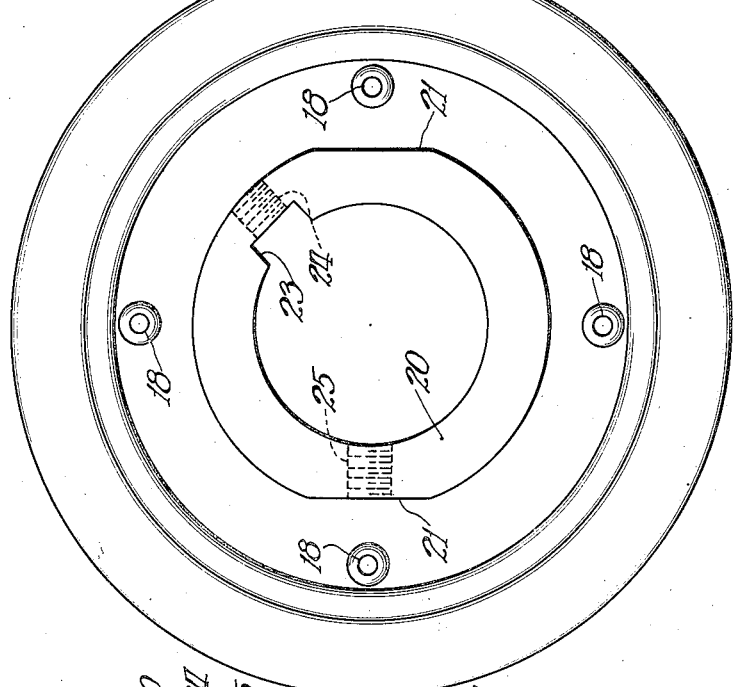
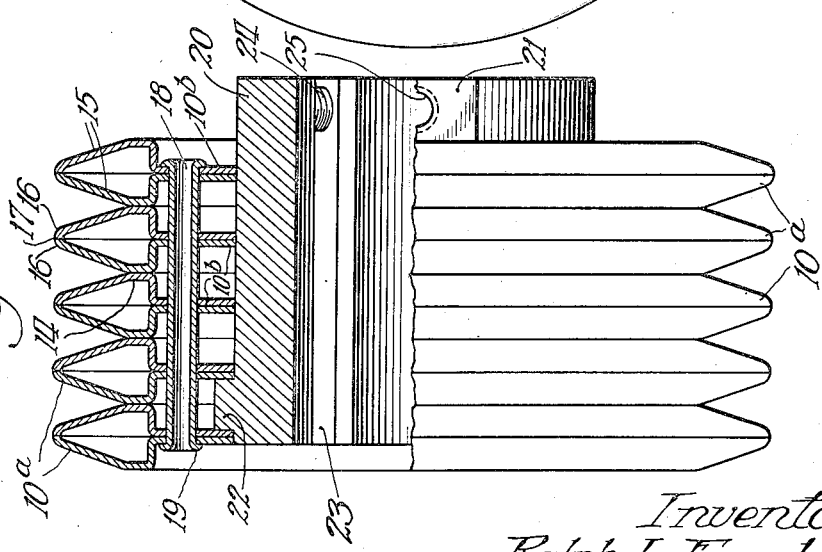
Inventor
Ralph L. Evenburgh
Wilson, Dowell, McCanna & Helm
Attys.

Patented Dec. 11, 1934

1,983,844

UNITED STATES PATENT OFFICE 1,983,844

SHEAVE

Ralph L. Evenburgh, Mishawaka, Ind., assignor to Dodge Manufacturing Corporation, Mishawaka, Ind., a corporation of Delaware Application December 7, 1929, Serial No. 412,406

18 Claims. (Cl. 64—17)

This invention relates to sheaves and aims to provide an improved sheave construction permitting the efficient and economical production of multiple-groove sheaves.

The invention will be readily understood by reference to the accompanying drawings, in which are shown two illustrative constructions embodying the invention, one designed for sheaves of larger diameters than the other.

In the drawings:

Fig. 1 shows the larger diameter sheave, half in longitudinal section and half in side elevation;

Fig. 2 is an end view of the same;

Fig. 3 is a cross section of one of the pressed steel discs of this sheave;

Fig. 4 is a half section and half elevation of the smaller diameter sheave;

Fig. 5 is an end view thereof; and

Fig. 6 is a cross section of one of the discs of Fig. 4.

It will be understood that the following description is made more particularly with reference to the specific embodiments of the invention herein selected for illustration, and is not to be taken as limiting the invention otherwise than as defined by the claims appended to this description.

The illustrative sheaves exemplify constructions in which annular discs or rings punched and pressed from sheet or plate metal, hereinafter called pressed steel discs, are utilized to provide sectional sheave bodies suitably grooved for engagement by driving belts.

Referring to Figs. 1 and 2, the construction therein illustrated comprises a collection of pressed steel discs 10 bound firmly together and appropriately secured on a tubular part or hub. These discs are formed with deflected rim portions and with annular shouldered portions stiffening the discs and providing axially offset abutment members. Their specific form in this instance includes annular humps 11 providing abutment face portions 12 parallel and concentric with but spaced axially from the opposite abutment face portions 13, 14. The rim portions 15 of the discs extend in this instance from the abutment face portions 14 and are deflected toward the planes of the opposite faces of the discs.

As shown, the discs are arranged alternately face to face and back to back, thereby providing sheave grooves or belt races by the diverging rim portions 15 of pairs of confronting discs, the outer edges of which are contiguous to the outer edges of adjacent discs so as to provide a substantially continuous grooved sheave perimeter.

As the confronting discs bear against one another through the co-acting front abutment face portions 13, 14 and against the adjacent discs through the co-acting back abutment face portions 12, the discs are firmly held in proper relationship, mutually bracing and supporting one another against any tendency to become deflected or tilted; while the construction of the discs is such as to prevent any material distortion by the compression due to the binding of the discs together. By virtue of the formation of the discs the compressive strains are transmitted centrally or inwardly of the deflected rim portions, relieving the rims of compressive strain.

The width, form and inclination of the deflected disc rim portions 15 of the discs will of course be appropriate to the form and dimensions of the sheave grooves or belt races required for the particular driving belts employed. V-shaped grooves for engagement by correspondingly formed driving belts are shown in this instance. The width of these grooves might be increased by interposing liners between the co-acting front abutment faces of confronting discs, and the distance between the centers of the grooves might likewise be increased by the interposition of liners between the back abutment faces of adjacent discs.

Where the discs bear against one another in direct contact, as in the illustrative construction, it is desirable to have the margins of the disc rim portions 15 terminate in flat-faced edges 17 flush with or in the planes of the back abutment faces of the discs, thereby providing additional abutment points 17, by which the walls of adjacent sheave grooves support or brace one another marginally. At the same time, the individual discs being entirely within the respective spaces bounded by the planes of their opposite abutment faces, the compression due to the binding of the discs together is transmitted inwardly of the disc rim portions, as aforesaid, there being substantially no transmission or compressive stress by the disc margins. By curving the marginal portions of the discs as indicated at 16, a strengthening and stiffening of the disc rim portions is obtained. This curvature of the marginal portions of the disc rims also results in rounded surfaces between adjacent belt races, as is obviously desirable.

Binding means for the assembled discs is represented by a number of ties 18 arranged at preferably equally spaced points around the sheave axis, and passing through the entire collection of discs and connected to the outer or end discs and thereby drawing them all together. In this instance the said ties 18, represented by tubular rivets, pass through abutting upset portions 12 of the discs. Tubular rivets are desirably employed, as in spinning over the ends of these tubular rivets at 19, the pressures may be held a little more constant than with solid rivets.

A hub on which the discs are assembled as shown is designated by the numeral 20. As a means for establishing a driving connection between the hub and discs, the hub is shown formed exteriorly with opposite flattened surfaces 21, and the bores of the discs are similarly formed to fit the hub. Thus the individual discs are firmly held in non-rotatable relation to the hub by broad engaging surfaces. All the discs being driven through these surfaces, they all do their share in transmitting the rotative force, and without throwing any strain on the rivets. This statement applies particularly to the discs in engagement with the driving belts, all of which substantially equally transmit the driving torque; while the two end discs in the specific construction shown furnish the same backing and rigidifying for the two end belt-race units of the sheave that are provided for the intervening units.

To hold the assembled discs securely in fixed position on the hub, or against axial displacement, the hub is provided at one end with an annular part 22 which is straddled and embraced by a pair of the connected discs. The annular part 22 may be an integral hub boss, as shown. Thus the expedient of interengagement between certain of the discs and the hub is utilized in a simple and efficient manner to hold the collection of discs fast in position on the hub. The collection of discs being tightly bound together by the rivets, the first and second discs in the construction shown are clamped against the opposite faces of the hub boss 22, providing a firm connection which is adequate to resist distortion under such strain in an axial direction as would ordinarily occur. As the discs are of a form which tends to stiffen them, and abut against one another with flat contact faces at right angles to the axis, and are clamped together and connected fast with the hub as stated, the construction as a whole is of a character to prevent any lateral deflection or tilting of the discs, and to maintain the important quality of having the belt races always in true line.

The hub 20, typifying any suitable tubular part on which the discs are carried and adapted for application to a shaft either directly or through an adapter bushing, is in this instance shown as a substantially thick hub bored to fit directly on a shaft. The bore of the hub is shown provided with a longitudinal keyway 23 to receive a key for engagement with a like keyway in the shaft, by which to hold the hub in non-rotatable relation to the shaft. A threaded set screw opening is indicated at 24 for a set screw to secure the key against longitudinal movement in relation to the hub; and a similar opening is indicated at 25 for a set screw to engage the shaft and secure the hub against longitudinal movement in relation to the shaft.

A sheave of the construction described, having the discs bound together by rivets arranged around the hub, and fastened on the hub by clamping an exterior hub boss between discs, must have what may be termed a minimum ring thickness for a sheave of given diameter and given size of belt races. That is to say, the radial dimension between the inner and outer edges of the discs must be sufficient to accommodate the rivets and to provide for the requisite disc abutment portions and requisite rim portions to provide the belt-race walls. This minimum ring thickness, which affects the size of hub which may be employed, may be materially reduced by forming the discs as shown in Figs. 4, 5 and 6. The sheave shown in these figures is of the same general construction and nearly the same specific construction as the one first described, and, insofar as the elements and parts thereof in Figs. 4, 5, and 6 are the same as in the preceding figures, the same reference numerals are applied thereto. However, the construction in Figs. 4, 5, and 6 differs specifically from the former in the following respects:

In Figs. 4, 5, and 6, the discs 10$^a$ are formed with flat central portions 10$^b$ from which are offset the abutment face portions 14. The rim portions 15 of the discs extend from the offset abutment face portions 14 as in the first construction, and the marginal edges 16 of the discs are flush with or in the planes of the abutment faces on the central portions. Thus the pairs of symmetrically disposed discs which provide the divergent walls of the belt races bear against each other at the abutment face portions 14, and they bear against the adjacent other discs at the edges 16 and at the contacting faces of the central portions 10$^b$. The discs are connected through these central portions 10$^b$ by the rivets 18, arranged close to the offset or shouldered portions of the discs, and the hub boss 22 is clamped between a pair of discs which provide a belt race, each of such discs being backed by an adjacent disc.

It will be seen that the construction of Figs. 4, 5, and 6 eliminates the disc shoulders adjacent to the inner edges of the discs, thus reducing the essential ring thickness, consequently permitting a reducton of outside sheave diameter for a given disc bore to suit a given size hub, or permitting an increase of diameter of the disc bores to fit a larger size hub, as for example, when a larger hub is desired for a larger shaft size.

The construction in Figs. 1, 2, and 3 has the advantage of the additional disc shoulders which provide the abutment face portions 13, and the additional stiffening and bracing effect incident to the additional shoulders. While the construction of Figs. 4, 5, and 6 lacks this advantage, it is simpler and provides a practicable design for sheaves of lesser essential ring thickness. With respect to the construction shown in Figs. 4, 5, and 6, it is thought inasmuch as the discs are circular and shouldered adjacent to their rim portions, and connected by a suitable number of rivets arranged fairly close to the shoulders, they are not liable to the distorted sufficiently to be material.

Either of the illustrative sheaves may be readily put together by assembling the discs on the hub in their proper relation, and connecting them by rivets inserted through the registering openings therefor in the discs. It will be understood that, in assembling, the discs are passed over the end of the hub farther from the boss 22, excepting the end disc or discs to be clamped against the opposite side of said boss and which therefore is placed on the short end of the hub.

It will be apparent that the invention provides a highly practicable and efficient sectional sheave construction combining a desirable strength and lightness by virtue of an advantageous utilization of sheet or plate metal. Various features of structural or functional value in connection with the invention have hereinbefore been indicated. It may be added that the composition of the sectional grooved sheave body of uniform pressed steel discs in pairs cooperating to provide the sheave grooves or belt races, secures the desirable effect of uniform equal sided grooves and equal carrying and torque transmitting supports for the respective walls.

Among the practical advantages of the invention, from a manufacturing standpoint, is ability of the manufacturer to minimize his investment in finished stock by carrying an assortment of hubs and discs and assembling them as required for fabrication of sheaves of different sizes and of different numbers of belt-races or grooves.

It will be understood that the invention is not limited to the particular embodiments illustrated, and that various features of the invention may be advantageously employed in various different constructions.

What I claim as my invention, and desire to secure by Letters Patent, is:

1. A sheave comprising a bound collection of sheet metal discs formed with deflected rim portions and arranged in pairs having their rim portions diverging to provide belt races, said discs having flat central parts at right angles to the sheave axis and being formed between their central parts and rim portions with axially spaced portions providing opposite abutment faces, the abutment face portions of adjacent discs cooperating for positioning the discs and transmitting the compressive strains due to the binding.

2. A sheave comprising a bound collection of pressed steel discs formed with deflected rims the margins of which are rounded and terminate in flat-faced edges parallel with the planes of the discs, said discs arranged in pairs of abutting symmetrically arranged discs with their rims diverging and with adjacent rims of adjacent pairs abutting at the said edges.

3. A sheave comprising a collection of sheet metal discs formed with central portions providing abutment faces and with surrounding axially offset portions providing opposite abutment faces and with deflected rim portions extending from said offset portions toward but not projecting beyond the planes of said first named abutment faces, said discs arranged alternately face to face and back to back, and ties passing through said central portions and binding the series of abutting discs together.

4. A sheave comprising a collection of sheet metal discs formed with flat central portions providing abutment faces and with surrounding laterally extending portions and other flat portions extending outwardly therefrom providing opposite abutment faces and with deflected rim portions extending from said last named flat portions toward but not projecting beyond the planes of said first named abutment faces, said discs arranged alternately face to face and back to back, and means cooperating with the central portions of the end discs by which the whole series of discs are bound together.

5. A sheave comprising a hub, a plurality of discs thereon formed with deflected rims and arranged alternately face to face and back to back, means connecting the discs independently of the hub, there being provision whereby a driving connection is established between individual discs and the hub, and there being connection between the hub and certain of the discs whereby the series of connected discs is held on the hub against axial displacement.

6. A sheave comprising a hub, a plurality of pairs of discs assembled on the hub, said pairs of discs formed and cooperating to provide belt races, ties extending through and binding the collection of discs together, there being driving connection between discs and the hub, and an annular part fixed axially in relation to the hub and embraced by a pair of the connected discs, whereby the collection of discs is secured in fixed position on the hub.

7. A sheave having a hub and a plurality of uniform sheet metal discs bound in assembly on the hub, said discs having axially spaced front and back abutment portions at right angles to the hub and with inclined portions extending outwardly and rearwardly from said front abutment portions, the central hub engaging portions of the discs being flat, the outer marginal portions of the discs having back abutment faces parallel with the front abutment faces, said discs arranged alternately face to face and back to back with the corresponding abutment faces of adjacent discs cooperating and the inclined portions of confronting discs diverging to form complemental belt race walls.

8. A sheave having a hub, a plurality of uniform sheet metal discs each formed with concentric axially spaced portions providing front and back abutment faces and with surrounding inclined portions arranged between the planes of said faces, said discs arranged alternately face to face and back to back on said hub, means independent of the hub binding the discs in assembly, the discs being non-rotatably mounted on the hub, and a projection on the hub embraced by adjacent discs to secure the assembly in position on the hub, every intermediate disc having its said abutment faces cooperating with the corresponding abutment faces of the adjacent discs, and adjacent confronting discs having their said inclined portions diverging and forming complemental parts of a belt race.

9. A sheave having a hub, a plurality of uniform sheet metal discs each formed with a flat central portion and an annular struck up front abutment portion and a surrounding rearwardly inclined portion extending from said front abutment portion and with a bent outer marginal portion providing a back abutment face in the same plane as the back face of said central portion, said discs arranged alternately face to face and back to back on the hub, and means coacting with the flat central parts of said discs binding the discs in assembly on the hub, adjacent confronting discs having their front abutment portions cooperating and their inclined portions diverging and forming complemental parts of a belt race, and adjacent discs in back to back relation cooperating at their central and outer marginal portions.

10. A sheave having a hub, a plurality of sheet metal discs assembled in pairs on the hub, each pair of discs having cooperating front abutment portions and surrounding diverging portions providing complemental walls of a belt race, all of the intermediate discs being alike and formed inwardly of said front abutment portions with axially spaced back abutment portions, the portions of the discs immediately surrounding said back abutment portions being bent at an angle thereto and said front abutment portions extending outwardly from said bent portions, the said back abutment portions of adjacent discs of adjacent pairs cooperating, and means cooperating with the end discs whereby all the discs are bound in assembly on the hub.

11. A sheave having a hub, a plurality of sheet metal discs assembled in pairs on the hub, each pair of discs having cooperating abutment portions and surrounding diverging portions providing complemental walls of a belt race, all of the intermediate discs being alike and formed with flat central portions from which the aforesaid abutment portions are struck up, said intermediate discs having bent outer marginal portions providing back abutment faces in the same planes as the back faces of said central portions, adjacent discs of adjacent pairs having their central and outer marginal portions cooperating, and means cooperating with the end discs whereby all the discs are bound in assembly on the hub.

12. A sheave comprising a hub, a plurality of sheet metal discs assembled on the hub in pairs, each pair having cooperating front abutment portions and surrounding diverging portions providing complemental belt race walls, all of the intermediate discs being alike and formed inwardly of their front abutment portions with back abutment portions axially spaced from said front abutment portions, adjacent discs of adjacent pairs having their back abutment portions cooperating, ties connecting the end discs and thereby binding the asembled discs together, and a boss on the hub embraced by a pair of said discs whereby the assembly of discs is held on the hub against axial displacement, the construction including provision for driving connection between the hub and discs.

13. A sheave comprising a hub, a plurality of sheet metal discs assembled on the hub in pairs, each pair having cooperating front abutment portions and surrounding diverging portions providing complemental belt race walls, all of the intermediate discs being alike and formed inwardly of their front abutment portions with axially spaced back abutment portions, adjacent discs of adjacent pairs having their back abutment portions cooperating, the innermost bored parts of the discs beig flat, said hub having a flat side and the bores of the discs being correspondingly formed so that the several discs are individually directly driven from the hub through broad engaging surfaces, and means cooperating with the end discs whereby all the discs are bound in assembly on the hub.

14. A sheave comprising a bound collection of sheet metal discs formed with annular shouldered or upset portions stiffening the discs and providing concentric axially spaced flat portions with connecting bent portions, said flat portions affording opposite abutment faces, and with deflected rim portions the outer edges of which do not project beyond the abutment faces on the same sides of the discs, said discs being all of the same size and form and arranged alternately face to face and back to back.

15. A sheave comprising a collection of sheet metal discs formed with axially offset opposite abutment face portions and with deflected rim portions, said discs arranged alternately face to face and back to back, and ties extending through abutment face portions of the discs binding the collection of discs together.

16. A sheave comprising a collection of sheet metal discs formed with annular shoulders and deflected rim portions not projecting beyond the planes of the back faces of the discs, said discs being arranged alternately face to face and back to back, the confronting discs cooperating to provide belt races and abutting one another adjacent to the belt races and abutting the adjacent discs centrally, the abutting central portions of the disc being flat, and a hub comprising a sleeve having the collection of discs secured thereon in fixed position and in driving connection therewith.

17. A sheave comprising a bound collection of sheet metal discs each having an annular flat portion and a surrounding laterally bent portion and another annular flat portion extending outwardly therefrom and an inclined rim portion extending outwardly and backwardly from said last mentioned flat portion, said discs arranged in alternately reversed positions, there being a plurality of pairs of said discs having their rim portions diverging to provide a corresponding plurality of belt races, said collection comprising said plurality of pairs of discs and end discs, all of the same form and size, the outer margins of the discs having abutting flat faces flush with the faces of the first mentioned flat portions, every intermediate disc and those adjacent to it having their corresponding flat portions coacting as abutment members, a hub on which said collection of discs is mounted with the individual discs in driving connection therewith, the central parts of the disc being flat and having openings to fit the hub, and means by which the collection of discs are bound in assembly on the hub.

18. A sheave comprising a collection of sheet metal discs formed with concentric flat portions providing abutment faces spaced in the same plane and with intermediate annular humps providing opposite abutment faces and with inclined rim portions extending outwardly from the outer flat portions toward but not beyond the planes of the abutment faces provided by said humps, said discs arranged alternately face to face and back to back, and ties passing through said humps and binding the series of discs together.

RALPH L. EVENBURGH.